United States Patent [19]

Beebe

[11] Patent Number: 5,351,405
[45] Date of Patent: Oct. 4, 1994

[54] APPARATUS AND METHOD FOR ANGLE-DEPENDENT PROCESSING OF OBJECTS

[75] Inventor: James C. Beebe, Kent, Ohio
[73] Assignee: Illinois Tool Works Inc., Glenview, Ill.
[21] Appl. No.: 52,380
[22] Filed: Apr. 23, 1993
[51] Int. Cl.⁵ .......................... G01B 5/24; G01B 3/56
[52] U.S. Cl. ........................................ 33/203; 33/534; 414/786
[58] Field of Search ............... 33/203, 203.15, 534, 33/538; 414/222, 786, 223, 224, 225, 226

[56] References Cited

U.S. PATENT DOCUMENTS

| | | | |
|---|---|---|---|
| 2,366,385 | 1/1945 | Comfort | 33/538 |
| 2,832,138 | 4/1958 | Sullenberger | 33/534 |
| 3,166,853 | 1/1965 | Marcus | 33/538 |
| 3,500,681 | 3/1970 | Shively | 73/146 |
| 3,518,878 | 7/1970 | Landsness et al. | 73/146 |
| 3,631,716 | 1/1972 | Monajjem | 73/146 |
| 3,911,739 | 10/1975 | Murata et al. | 73/146 |
| 4,198,858 | 4/1980 | Farmer et al. | 73/146 |

*Primary Examiner*—William A. Cuchlinski, Jr.
*Assistant Examiner*—G. Bradley Bennett
*Attorney, Agent, or Firm*—Ruden, Barnett, McClosky, Smith, Schuster & Russell

[57] ABSTRACT

Methods and apparatus for determining an angular location on a round object during a current operation in order to facilitate positioning the object for subsequent operation. At a first station, an angular location identifying feature is sensed, and an angle at which a predetermined desired angular location is located with respect to the feature is determined. At a second station, the feature is sensed, the object is indexed from the feature in an amount equal to the angle, and the object is marked at the relocated predetermined desired angular location. Another method eliminates the marking step at the second station, and the subsequent operation is performed instead. Apparatus comprises a first station means and a second station means. The first station means includes means for sensing an angular location identifying feature on the object and measurement means for determining an angle at which a predetermined desired angular location on the object is located with respect to the feature. Second station means includes sensing means for sensing the feature, indexing means for indexing from the feature in an amount equal to the angle, and marking means for marking the object at the relocated desired location.

31 Claims, 3 Drawing Sheets

F1

APPARATUS AND METHOD FOR ANGLE-DEPENDENT PROCESSING OF OBJECTS

FIELD OF THE INVENTION

The invention relates to angle-dependent processing of objects such as tires, wheels or tire/wheel assemblies wherein the processing of the object at a given processing station requires angle-specifying information generated or defined previously at some other processing station.

BACKGROUND OF THE INVENTION

In the processing of round objects, it frequently becomes necessary to perform a subsequent operation based on an angular location on the object identified in a current operation. Normally, this requirement is achieved by placing a mark upon the object during the current operation. That mark is then used as a reference for positioning of the round object during the subsequent operation.

For example, in the processing of automobile tires and wheels, it is known to place a mark upon the tire at an angular location corresponding to the high point of the first harmonic of the radial force variation of the tire, and to form a valve stem hole on the wheel at an angular location corresponding to the low point of the first harmonic of the average radial runout of the wheel. During subsequent processing, when the tire is mounted upon the wheel, it is desirable to align the tire and wheel such that the marks are at the same angular location. This effectively reduces radial force variation in the resulting tire/wheel assembly.

However, physically placing marks upon the objects consumes cycle time and thus reduces process throughput. For example, in order to form a visible mark on the sidewall of a tire at a location identified by a tire uniformity machine, it is necessary to substantially stop rotation of the Tire with the high point of the radial force variation oriented in the direction of the marking device, and to then wait while the mark is applied to the tire. These steps can consume as much as 5% of the machine's cycle time on the average.

In other equipment, it has been known to reduce this consumption of cycle time by providing a second station on the machinery dedicated to carrying out the marking operation. While this second station adds expense to the machinery, it is nonetheless frequently beneficial to the cost effectiveness of the machinery to perform the marking operation at this second station. However, in tire uniformity machinery, it is not possible to accurately apply an angular mark at a second station of the machine. This is so because the tire must be "tripped" from the test rim of the first station and them moved to the second station; this causes loss of angular orientation of the tire.

It has therefore been a main objective of the present invention to provide methods of and apparatus for overcoming the difficulties associated with the current practices, and to provide a faster throughput in processing round objects such as tires and wheels.

It has been another object of the present invention to eliminate the requirement of marking round objects at a specific angular location.

According to the method of the invention an already-existing feature of the object is sensed in order to identify an angular reference. Thereafter, an angle indicating the position of the angular location of interest with respect to the angular reference is determined. Each of the foregoing steps can be carried out at a first station such as a tire uniformity machine without need of either braking rotation of the tire or of forming a new mark on the tire.

SUMMARY OF INVENTION

In achieving these objectives, in the processing of round objects a method of determining an angular location on a round object during a current operation in order to facilitate positioning the object for a subsequent operation is provided. The method comprises the steps of: sensing a feature on the object identifying a specific angular location thereon, and determining an angle at which a predetermined desired angular location on the object is located with respect to the feature; and at a second station, sensing the feature, indexing from the feature in an amount equal to the angle thereby relocating the predetermined desired angular location with respect to the feature, and marking the object with a mark at the predetermined desired angular location. The mark then facilitates positioning the object for a subsequent operation, such as pairing tires with wheels.

The invention contemplates that the object is an automobile wheel wherein the identifying feature is a valve stem hole, or an automobile tire wherein the identifying feature is an auxiliary mark applied thereto at a random location. Such an auxiliary mark could be in the form of, for example, a label. The identifying feature could as well be determined by autocorrelation.

In order to automate the method, the angle can be stored at the first station and then recalled at the second station. Indexing can then be performed as described.

The angle can be stored in computer memory or in any number of tangible media, which media may be human-readable or machine-readable, such as printed bar code, magnetic floppy disks, or magnetic tape. The tangible media can be affixed to the object so that the angle can be recalled should the object be transported to a remote location for the marking step.

If the subsequent operation, namely pairing of tires with wheels, is to be performed on the object at the second station, the marking step may be eliminated. In this event, therefore, the method comprises: at a first station, sensing an angular location identifying feature on the object, and determining an angle at which a predetermined desired angular location on the object is located with respect to the feature; and at a second station, sensing the feature, indexing from the feature in an amount equal to the angle thereby relocating the predetermined desired angular location with respect to the feature, and performing the subsequent operation on the object which is dependent on the relocated predetermined desired angular location.

Apparatus is provided for determining an angular location on a round object during a current operation in order to facilitate positioning the object for a subsequent operation. The apparatus comprises a first station means and a second station means. The first station means includes means for sensing an angular location identifying feature on the object and measurement means for determining an angle at which a predetermined desired angular location on the object is located with respect to the feature. The second station means includes sensing means for sensing the feature and indexing means for indexing from the feature in an amount equal to the angle thereby relocating the predetermined desired angular location with respect to the feature. Data storage means can be employed to store the angle at the first station means, to be recalled subsequently at the second station means for the indexing step. The second station means can further include marking means for marking the object with a mark at the relocated predetermined desired angular location.

One advantage of the present invention is that throughput loss caused by marking angular locations on round objects has been reduced.

Another advantage of the present invention is that, if desired, the entire step of marking an angular location on a round object for performing a subsequent operation thereon may be eliminated.

These and other objects and advantages of the present invention will become more readily apparent during the following detailed description taken in conjunction with the drawings herein in which:

DESCRIPTION OF PREFERRED EMBODIMENTS

Figure 1:
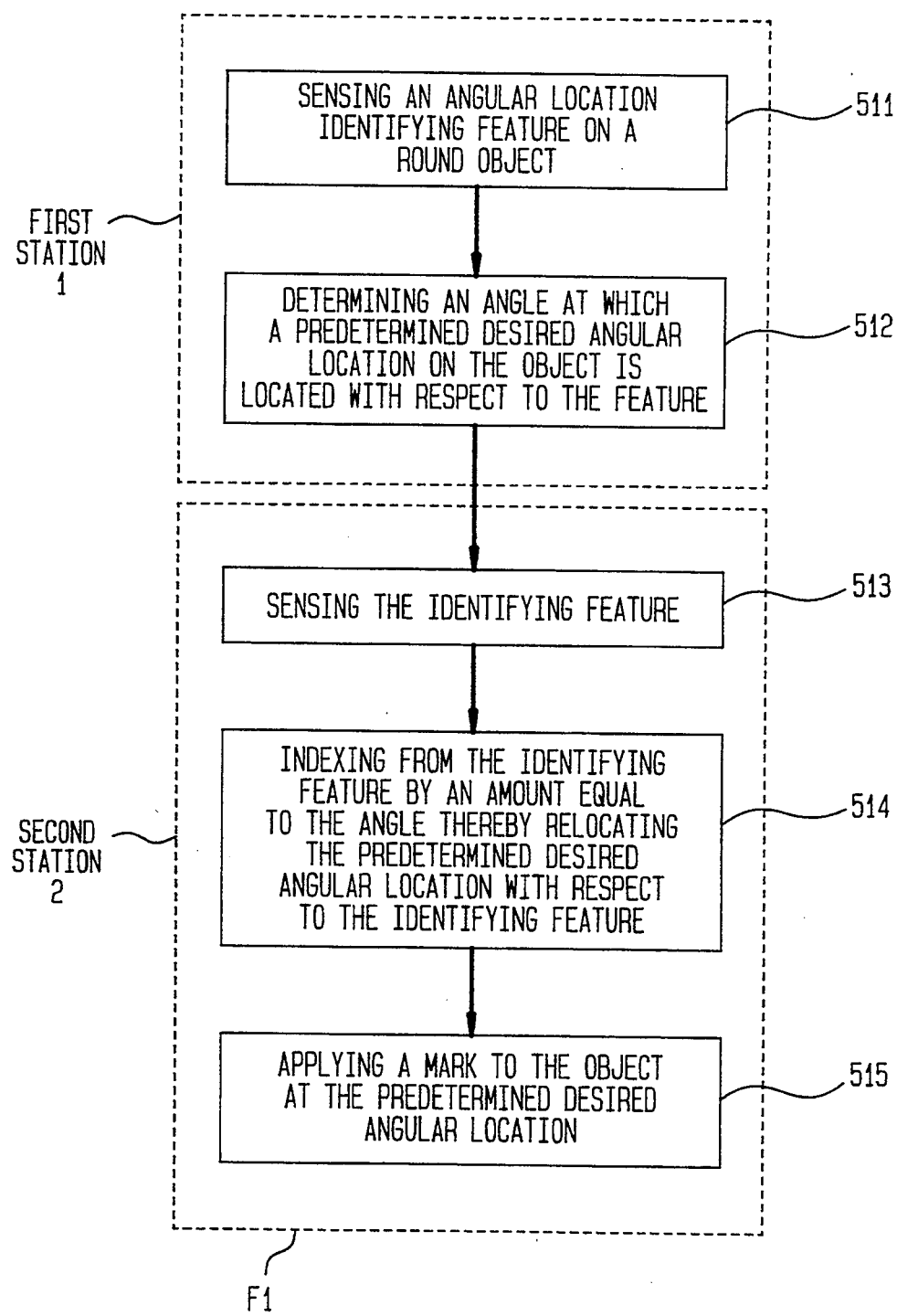
FIG. 1 is a flowchart illustrating a method of determining an angular location on a round object during a current operation in order to facilitate positioning the object for a subsequent operation.
Figure 3:
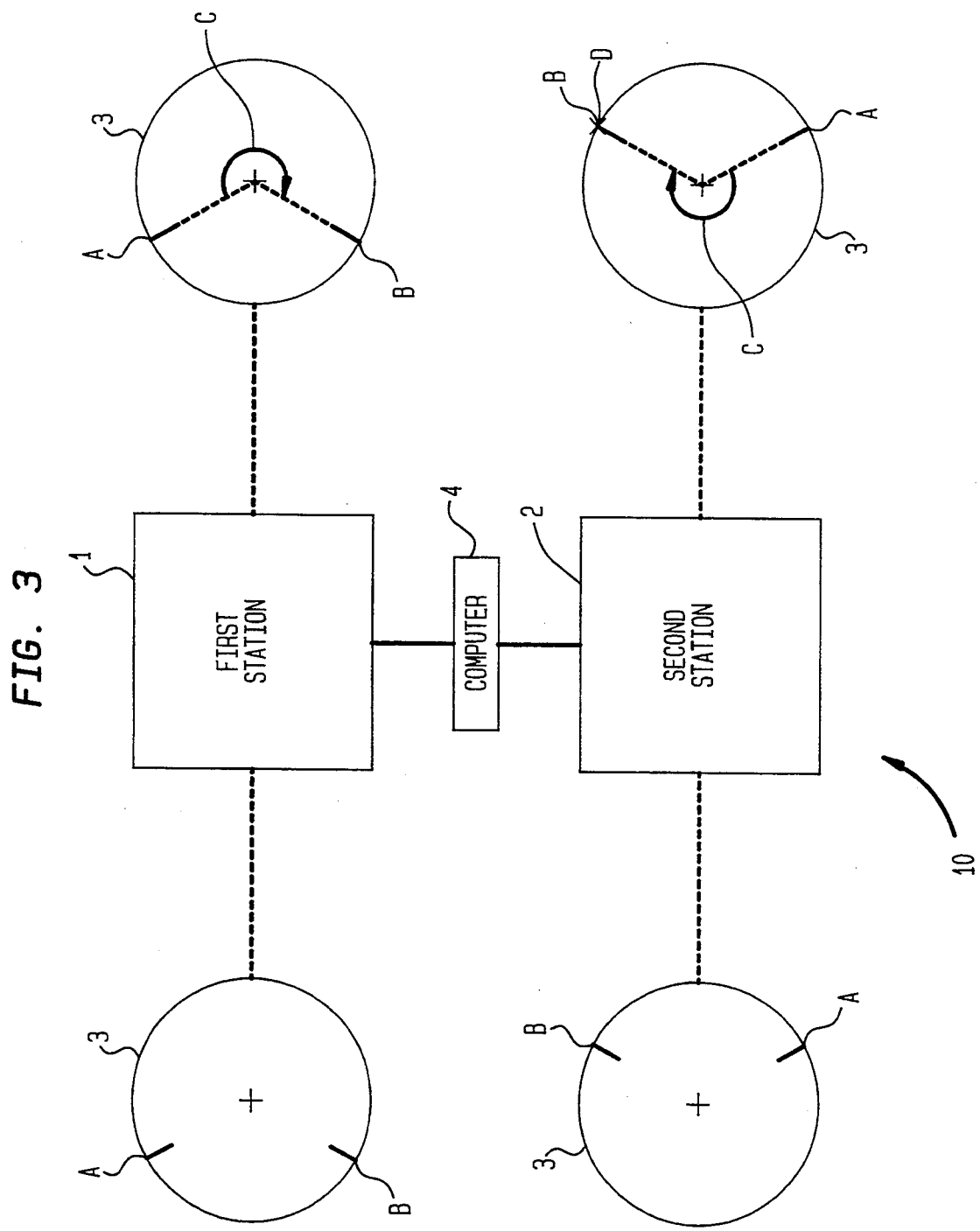
FIG. 3 is a schematic of apparatus capable of carrying out the methods of the present invention.

With reference first to FIGS. 1 and 3, there is illustrated a flowchart F1 for determining an angular location on a round object during a current operation in order to facilitate positioning the object for a subsequent operation, and apparatus 10 therefor, respectively.

Referring specifically to FIG. 3, there is illustrated a round object 3, and first and second stations 1 and 2 for processing the round object 3. The round object 3, in the preferred practice of the present invention, is either an automobile tire or an automobile wheel. Upon round object 3, A designates an angular location identifying feature. This feature A could take various forms, one of which could be a valve stem hole in a tire wheel, or an arbitrarily placed label on the sidewall of a tire. A predetermined desired angular location B is known, and it is desired to determine the angle C at which this predetermined desired angular location B resides with respect to the angular location identifying feature A for marking of the object 3 at location B to facilitate subsequent processing of the round object.

Specifically, B represents the high point of the first harmonic of the radial force variation of the tire, or alternatively the low point of the first harmonic of the average radial runout of wheel. It can be assumed, for the practice of the present invention, that the high point of the first harmonic of the radial force variation of the tire has been previously determined with a conventional tire uniformity optimizer, and is readily identifiable by first station 1. Similarly, the low point of the first harmonic of the average radial runout of the wheel has been previously determined by a conventional, wheel uniformity analyzer, and likewise is readily identifiable by first station 1. Therefore, it will be appreciated that as round object 3 enters first station 1, the first station 1 is able to determine the position B on the round object 3 based on the previous results of the wheel uniformity analyzer or tire uniformity optimizer, as is the case.

After round object 3 has entered the first station 1, sensing means within the first station 1 senses the angular location identifying feature B on the object 3, as instructed by step 511 of flowchart F1. As previously mentioned, the identifying feature B would normally take the form of a valve stem hole for an automobile wheel, and an auxiliary mark, such as a label, applied at a random angular location on an automobile tire. The sensing means of the first station 1 for sensing the identifying feature B could be any number of conventional sensing means, and could employ a physical contact probe, such as would pick up a valve stem hole in an automobile wheel, or could just as easily be a non-contact probe such as an optical sensor. Furthermore, utilizing a non-contact probe such as optical sensor, the signal processing technique of autocorrelation could be employed to determine an identifying feature.

Once the first station 1 has identified the angular location identifying feature A on the object 3, the station 1 them determines, by any conventional measuring means, the angle C at which the predetermined desired angular location B is located with respect to the feature A, as instructed by step 512 of flowchart F1.

In order to mark the round object 3 at the desired location B, it is necessary to store or otherwise record the angle C for subsequent recollection at the second station 2, wherein the marking will occur. Accordingly, the angle C can be stored, or example, in computer 4 by the first station 1, for subsequent recall by the second station 2. This scenario would be ideal in the warehouse-type manufacturing and assembly operation wherein the angle C is determined at one location in the warehouse, and the object 3 is then transported to another location within the same warehouse or manufacturing facility for the subsequent marking operation to be performed on the object 3. Alternatively, the round object 3, be it an automobile tire or an automobile wheel, may be transferred to a remote assembly plant for marking. In this scenario, the angle C can readily be stored in any number of tangible media. Such media could be human-readable, or in a preferred embodiment, would be machine- readable, such as printed bar code, a magnetic floppy disk, or a magnetic tape. In this scenario the tangible media would be affixed to the object 3 and transported therewith to the remote location so that the angle C could be recalled utilizing conventional data recollection means and the subsequent marking be performed on the object 3 thereat.

Accordingly, step 513 of the flowchart F1 involves sensing the identifying feature A at the second station 2, by such means as previously described. Step 514 at the second station 2 involves indexing from the identifying feature A in an amount equal to the angle C thereby relocating the predetermined desired angular location B with respect to the identifying feature A. Of course, any conventional rotary indexing means can be employed to perform this step 514. Finally, step 515 involves marking the object with a mark D at The relocated desired angular location B. At this point, the round object 3, be it an automobile tire or wheel, is ready for pairing to an automobile wheel or tire, respectively, as the case may be, .and may be done so by simply matching the marks D prior to assembly.

Figure 2:
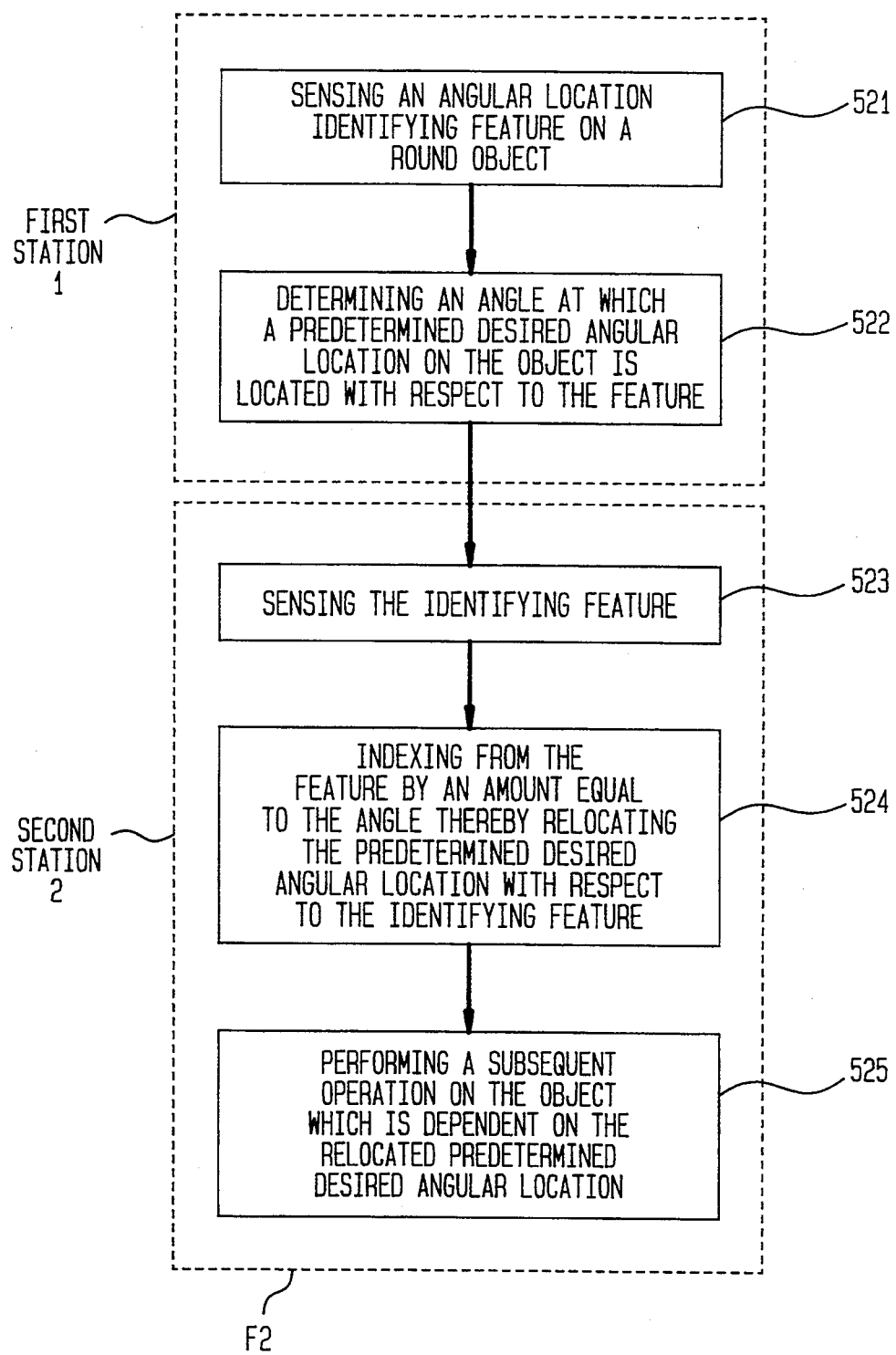
FIG. 2 is a flowchart illustrating a method of processing round objects which includes determining an angular location on a round object during a current operation in order to facilitate positioning the object for a subsequent operation.

Another method of the present invention is illustrated in FIG. 2 as flowchart F2. In flowchart F2 the marking step 515 of flowchart F1 is eliminated, and the subsequent operation to be performed on the object, namely, pairing, which is dependent on the predetermined desired angular location, is performed at the second station 2 as step 525. The method of flowchart F2 would be ideal for a warehouse-type manufacturing and assembly operation wherein the angle C is determined at the first station 51, and the object 3 is then transported to another location within the same warehouse or manufacturing facility for subsequent processing to be performed on the object 3, as for example pairing of tires with wheels. Similarly, the round object 3, be it an automobile tire or an automobile wheel, may be transferred to a remote assembly plant, or to an automobile manufacturer, for subsequent pairing and assembly of tires with wheels. As previously described, if the second station is located in the same warehouse or factory facility as the first station, the angle C can be stored in a computer 4 by the first station 1 for subsequent recall by the second station 2. Further, any conventional data transmission means, such as local area networks, may be employed therefor. And, as described earlier, should the automobile tire or automobile wheel be transferred to a remote assembly plant or to an automobile manufacturer, the angle C can be readily stored in any number of tangible media, which can be affixed to the object 3 and transmitted therewith such as printed bar code, a magnetic floppy disk, or a magnetic tape.

While I have described only two embodiments of the present invention, those skilled in the art will readily recognize adaptations and modifications which can be made to the present invention which will result in an improved method and apparatus for determining angular locations on round objects, yet all of which will be within the spirit and scope of the present invention as defined in the appended claims. Accordingly, I intend to be limited only by the following claims.

What is claimed is:

1. In the processing of round objects, a method of determining an angular location on a round object during an operation in order to facilitate positioning said object for a subsequent operation, said method comprising the steps of:
   1) at a first station,
      a) sensing an angular location identifying feature on said object, and
      b) determining an angle at which a predetermined desired angular location on said object is located with respect to said feature,
      c) electronically storing information indicative of said angle, and
   2) at a second station,
      a) sensing said feature,
      b) based on said information, indexing from said feature in an amount equal to said angle thereby relocating said predetermined desired angular location with respect to said feature, and
      c) marking said object at said predetermined desired angular location.

2. The method of claim 1 wherein said object is an automobile wheel and said identifying feature is a valve stem hole.

3. The method of claim 1 wherein said object is an automobile tire and said identifying feature is an auxiliary mark applied thereto at a random angular location.

4. The method of claim 3 wherein said auxiliary mark is a label.

5. The method of claim 1 wherein said identifying feature is determined by autocorrelation.

6. The method of claim 1 wherein said angle is stored at said first station and recalled at said second station.

7. The method of claim 6 wherein said angle is stored in a computer memory.

8. The method of claim 6 wherein said angle is stored in a tangible medium.

9. The method of claim 6 wherein said medium is human-readable.

10. The method of claim 6 wherein said medium is machine-readable.

11. The method of claim 6 wherein said medium is affixed to said object.

12. The method of claim 6 wherein said medium is a printed bar code.

13. The method of claim 6 wherein said medium is a magnetic floppy disk.

14. The method the claim 6 wherein said medium is a magnetic computer tape.

15. A method of processing round objects, said method including determining an angular location on a round object during an operation in order to facilitate positioning said object for a subsequent operation, said method comprising the steps of:
   1) at a first station,
      a) sensing an angular location identifying feature on said object, and
      b) determining an angle at which a predetermined desired angular location on said object is located with respect to said feature; and
      c) electronically storing information indicative of said angle, and
   2) at a second station located a distance away from said first station,
      a) sensing said feature,
      b) based on said information indexing from said feature in an amount equal to said angle thereby relocating said predetermined desired angular location with respect to said feature, and
      c) performing said subsequent operation on said object, said subsequent operation being dependent on said relocated predetermined desired angular location.

16. The method of claim 15 wherein said object is an automobile wheel and said identifying feature is a valve stem hole.

17. The method of claim 15 wherein said object is an automobile tire and said identifying feature is an auxiliary mark applied thereto at a random angular location.

18. The method of claim 15 wherein said auxiliary mark is a label.

19. The method of claim 15 wherein said identifying feature is determined by autocorrelation.

20. The method of claim 15 wherein said angle is stored at said first station and recalled at said second station.

21. The method of claim 20 wherein said angle is stored in computer memory.

22. The method of claim 20 wherein said angle is stored in a tangible medium.

23. The method of claim 22 wherein said medium is human-readable.

24. The method of claim 22 wherein said medium is machine readable.

25. The method of claim 22 wherein said medium is affixed to said object.

26. The method of claim 22 wherein said medium is printed bar code.

27. The method of claim 22 wherein said medium is a magnetic floppy disk.

28. The method of claim 22 wherein said medium is a magnetic computer tape.

29. Apparatus for determining an angular location on a round object during a current operation in order to facilitate positioning said object for a subsequent operation, said apparatus comprising:

first station means, said first station means including sensing means for sensing an angular location identifying feature on said object, measurement means for determining an angle at which a predetermined desired angular location on said object is located with respect to said feature, information storage means for storing information indicative of said angle, and second station means located a distance away from said first station means, said second station means comprising sensing means for sensing said feature, and indexing means communicating with said information storage means for, based on said information, indexing from said feature in an amount equal to said angle thereby relocating said predetermined desired angular location with respect to said feature.

30. The apparatus of claim 29 wherein said first station means further includes storage means for storing said angle and said second station means further includes recall means for recalling said angle.

31. The apparatus of claim 29 wherein said second station means further includes marking means for marking said object with a mark.

* * * * *